United States Patent
Schwender et al.

(10) Patent No.: US 10,596,493 B2
(45) Date of Patent: Mar. 24, 2020

(54) SUPPORT STRUCTURE FOR A FILTER ELEMENT

(71) Applicant: HYDAC FILTERTECHNIK GMBH, Sulzbach/Saar (DE)

(72) Inventors: Matthias Schwender, Kirkel (DE); Andreas Schmitz, Kirkel (DE); Edwin Koch, Tholey (DE); Stefan Jochum, Hüttigweiler (DE)

(73) Assignee: HYDAC FILTER TECHNIK GMBH, Sulzbach/Saar (DE)

( * ) Notice: Subject to any disclaimer, the term of this patent is extended or adjusted under 35 U.S.C. 154(b) by 1161 days.

(21) Appl. No.: 13/261,837

(22) PCT Filed: Oct. 6, 2012

(86) PCT No.: PCT/EP2012/004198
§ 371 (c)(1),
(2) Date: Apr. 7, 2014

(87) PCT Pub. No.: WO2013/050176
PCT Pub. Date: Apr. 11, 2013

(65) Prior Publication Data
US 2014/0291235 A1      Oct. 2, 2014

(30) Foreign Application Priority Data

Oct. 7, 2011  (DE) .................. 10 2011 115 050

(51) Int. Cl.
*B01D 29/13*  (2006.01)
*B01D 29/11*  (2006.01)
*B01D 29/21*  (2006.01)

(52) U.S. Cl.
CPC ............ *B01D 29/13* (2013.01); *B01D 29/111* (2013.01); *B01D 29/21* (2013.01); *B01D 2201/0407* (2013.01); *B01D 2201/0415* (2013.01); *B01D 2201/52* (2013.01)

(58) Field of Classification Search
CPC ....... B01D 29/13; B01D 29/11; B01D 29/111; B01D 29/21; B01D 2201/0407; B01D 2201/0415; B01D 2201/52
USPC ..................................... 210/483, 435, 494.1
See application file for complete search history.

(56) References Cited

U.S. PATENT DOCUMENTS

| 4,309,878 A | 1/1982 | Brennan |
| 5,417,610 A | 5/1995 | Spransy |
| 5,460,721 A * | 10/1995 | Goodwin .............. B01D 29/111 156/190 |
| 5,664,628 A * | 9/1997 | Koehler ................ B01D 29/111 166/228 |
| 6,481,580 B1 | 11/2002 | Amstutz et al. |
| 6,840,386 B2 | 1/2005 | Steger, Jr. et al. |

(Continued)

FOREIGN PATENT DOCUMENTS

| EP | 1 391 229 A1 | 2/2004 |
| WO | WO 00/76620 A1 | 12/2000 |

*Primary Examiner* — Robert Clemente
*Assistant Examiner* — Akash K Varma
(74) *Attorney, Agent, or Firm* — Wenderoth, Lind & Ponack, L.L.P.

(57) ABSTRACT

A support structure (16) for a filter element includes at least one surface part (10), in which one or more fluid passage openings (12a-12e) with predetermined opening cross-sections are formed. The opening cross-section of at least one fluid passage opening (12a-12e) is at least partially elliptical-shaped.

12 Claims, 3 Drawing Sheets

(56) References Cited

U.S. PATENT DOCUMENTS

| | | | |
|---|---|---|---|
| 2001/0047958 A1* | 12/2001 | Estep | B01D 29/15 |
| | | | 210/433.1 |
| 2003/0155293 A1* | 8/2003 | McGrath | B01D 29/111 |
| | | | 210/457 |
| 2004/0031736 A1* | 2/2004 | Evans | B01D 29/216 |
| | | | 210/167.02 |

* cited by examiner

SUPPORT STRUCTURE FOR A FILTER ELEMENT

FIELD OF THE INVENTION

The invention relates to a support structure for a filter element, comprising at least one surface part. One or more fluid passage openings having predetermined opening cross-sections are formed in the support structure.

BACKGROUND OF THE INVENTION

A support structure for a filter element is known from U.S. Pat. No. 5,783,067, for example. The known support structure forms the wall of a support tube, which encloses the outer surface of a filter medium, and which has a pattern of holes that form fluid passage openings. The fluid passages in the support tube are formed as rounded oblong holes, each of which has two side lines that extend parallel to one another, and two curved lines that connect the side lines to one another. The fluid passage openings, which are formed as oblong holes, are aligned in such a way that they each extend in a radial direction along the support tube.

Good operating behavior of the filtering elements used is paramount for the operation of filtering devices, such as those used in hydraulic systems for the filtration of hydraulic fluids, or in other systems for the filtration of fuels, lubricants or other operating resources. The main considerations here are a self-supporting support of the filter media against flow forces acting thereon, which requires a high degree of mechanical strength in the respective support structure. Also, a minimum level of flow resistance should be generated by the support structure. In order to cope with these conflicting demands as much as possible, the prior art forms hole patterns having round holes. In order to achieve the desired low values in the flow resistance, the holes must be disposed such that they are densely packed. Material supports formed between the holes then form weak points in the support structure, making achieving an optimum compromise, as a rule, of structural performance and fluid permeability impossible.

SUMMARY OF THE INVENTION

An object of the invention is to provide an improved support structure for a filter element, which support structure is characterized by a high degree of mechanical strength while at the same time, being characterized by good fluid permeability.

This object is basically achieved by a support structure having the opening cross-section of at least one fluid passage opening being formed at least partially elliptical-shaped. An improved mechanical stability, or more precisely, an increased tensile strength and an increased burst pressure of the surface part or of the support structure, respectively, is achieved. At the same time, good fluid permeability is achieved. As a result of the elliptical shape of the formation of the respective opening cross-section, the load on the material is decreased when tension or force is introduced into the support structure. The design according to the invention leads to a removal of the load on the material at the narrow or weak points in the structure when under load as a result of flow forces.

An especially preferred support structure according to the invention is characterized in that, when positioned, the surface part forms a casing, which is formed from a continuous, web-shaped strip. The winding direction of that strip extends transversely relative to the longitudinal axis of the casing-shaped structure. In particular, the winding direction of the strip is formed in the shape of a coil, spiral or helix. A high degree of bracing and pressure stability for the structure in question here is created as a result of such a helical structure for the support structure.

A preferred embodiment of the support structure according to the invention is characterized in that first surface regions, which are aligned in a winding direction that extends transversely with relation to the longitudinal direction of the casing, each have uniformly disposed, adjacent fluid passage openings. Each passage opening has elliptical opening cross-sections. There is an improved flow behavior with less resistance through the otherwise closed casing shape of the support structure as a result of the uniform arrangement of fluid passage openings. Preferably, second surface regions, in which no fluid passages are formed, are provided between each of the web-shaped first surface regions.

A further, especially preferred embodiment of a support structure is characterized in that, in the case of a winding structure, junctions, preferably implemented in the form of a welded joint or a continuously formed folded seam, of adjacent surface parts of the ribbon-shaped surface part coiled in the winding direction, are preferably disposed in the second surface regions. Free fluid passage openings are left in the first surface regions. Closed junctions are hereby made available, which make the implementation of both a continuous welded joint and a continuously formed folded seam or flanged weld possible. The necessary connection point also permits avoiding impeding the fluid passage through the fluid passage openings. Instead of the winding structure, the support structure may be formed from a cylindrical casing, with or without a longitudinal seam. In this respect, the junctions are eliminated. To obtain a good pressure stability of the support structure, however, advantageously surface parts are provided in the regions between the fluid passage openings, which are designed as a closed casing surface.

Especially advantageously in the case of a web-shaped continuously formed strip or surface part, axially disposed fluid passage openings are provided. The passage openings are delimited by the adjacent, opposite strip edges of the second surface regions, which later form the junctions. The continuous strip in question can be easily produced and can be provided with the necessary elliptical perforation.

A further, especially preferred embodiment of a support structure according to the invention is characterized in that the slope of the winding direction is selected in such a way that, when the surface part is completely wound, the respective principal axes of the ellipses of the fluid passage openings follows the winding direction, or is disposed parallel, or transversely to the longitudinal axis of the support structure casing. Through the targeted specification of the orientation of the principal axes of the ellipses for the fluid passage openings, a flow of fluids can be selectively influenced. In particular, one kind of direction of the principal axis of the ellipse can be selected, and another kind of orientation can be selected in adjacent regions along the outer circumference of the support structure casing in predeterminable regions. In this way a homogenization of the fluid current in the flow can be achieved.

An at least partially elliptical formation of the respective opening cross-section is to be understood in such a way that the outer contour of the respective opening cross-section is formed at least partially following an elliptic arc. The ellipse is the geometric location of all points, for which the sum of the distances from two given points, the focal points, is equal to a constant. The eccentricity of the ellipse is associated with the characteristics of the focal points or, or more precisely two focal points. The ellipse hereby differs from a circle. Elliptical-shaped, within the meaning of the invention, means essentially elliptical and includes oval and ovoid shapes. The opening cross-section of the respective fluid passage opening may have the form of a semi-ellipses or a full ellipses.

The fluid passage openings are advantageously uniformly formed and/or disposed on the surface part. This formation and disposition provides the advantage in particular of spatially homogeneous features of the support structure, and accordingly, of spatially homogeneous filtration properties of a filter element provided with a support structure according to the invention. The invention further relates to a filter element comprising a support structure according to the invention and at least one filter medium that abuts the support structure. The filter medium may be designed in a conventional manner, for example in the form of a multi-layered filter mat web, which is folded in a pleated manner and which is placed in the form of a cylindrical hollow body. The surface part of the support structure forms a flow surface, though which fluid may pass in accordance with the opening cross-sections of the fluid passage openings.

In the case of a preferred embodiment of the support structure according to the invention, the corresponding fluid passage openings in at least one surface region of the surface part are disposed in rows, columns and/or according to a specific pattern. In addition to facilitating the manufacture of the support structure, an optimum compromise of structural performance and fluid permeability is also achieved. The fluid passage openings and of a corresponding pattern may be formed in different manners, for example, by lasers, pressing or, advantageously, by punching in the case of materials that are suitable for hole punches. A sheet of metal, which is corrosion resistant to the media that are to be filtered, may be used as a material that is suitable for hole punches. This material may be a fire-laminated sheet of metal (Zincon®), which may be galvanized. In the case of a winding structure of the support structure, the junctions of adjacent surface parts may be soldered together. The support structure can also be produced out of a plastic material.

In a further embodiment of the support structure according to the invention, at least one marking area, each having a recognizable marking, is formed on the surface part. The marking is advantageously formed such that it is recognizable both visually and to the touch, for example as printing, labeling and/or raised features. In so doing, the respective marking is advantageously formed on an outer surface of the support structure or of the filter element.

Especially preferred the respective marking can be formed by at least one further fluid passage openings in the surface part. Such a marking can be introduced into the support structure without a great deal of extra effort, and is characterized by high visibility as well as precise readability from both sides of the surface part.

The respective surface part is preferably formed into a casing body, which may abut an inner surface and/or an outer surface of a filter medium. Especially preferred, the respective casing body can be formed having a tubular cylindrical shape, and thus in this regard, form a support tube. The shape of the respective casing body can deviate from a cylindrical shape, for example, having a polygonal cross-section.

According to the invention, the above-mentioned and the subsequently presented features may each be used individually or combined with one another in any combination.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that purely are schematic and not to scale.

DETAILED DESCRIPTION OF THE INVENTION

Figure 1A:
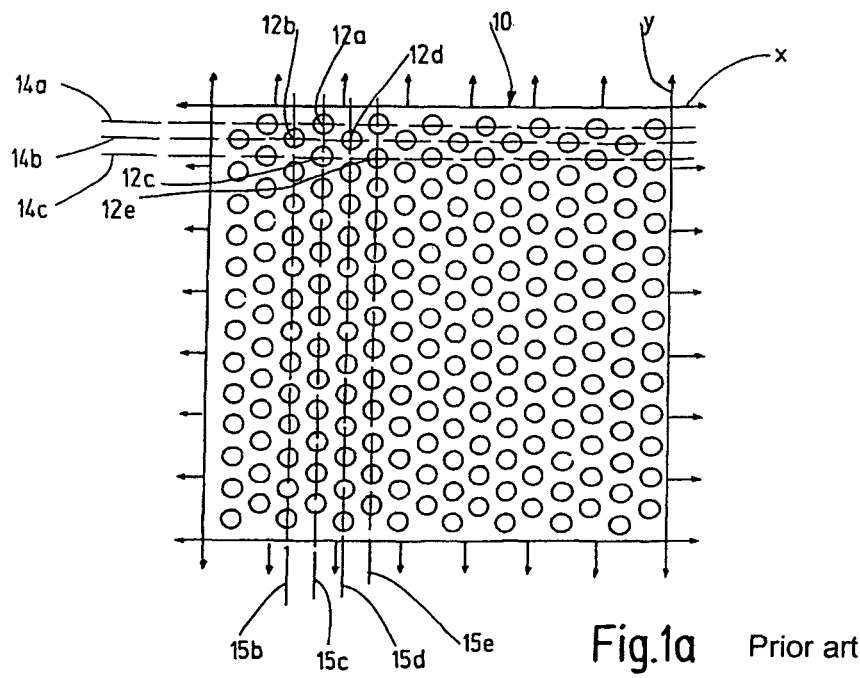
FIG. 1a is a top view of a surface part known from the prior art.
Figure 2A:
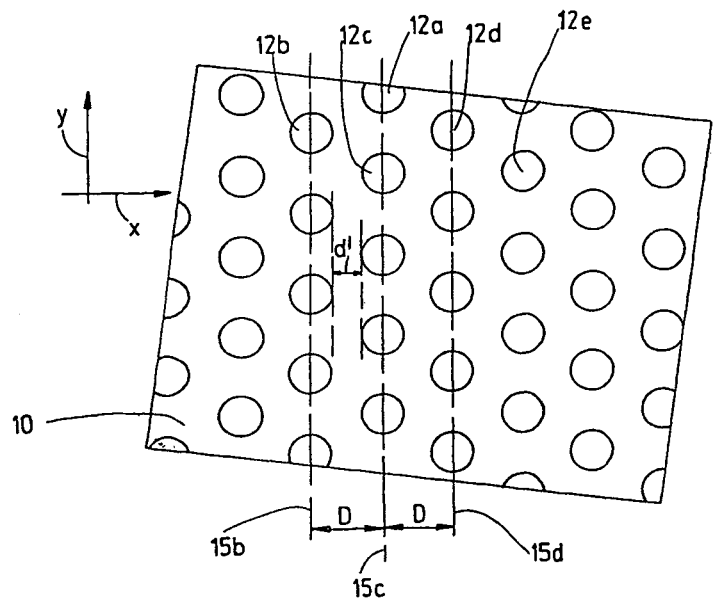
FIGS. 2a and 2b are enlarged and partial top views the surface parts from FIGS. 1a and 1b, respectively.

An illustration of the surface part 10 is shown in FIG. 1a and enlarged in FIG. 2a, which extends horizontally in the direction of the x-axis and vertically in the direction of the y-axis, and which, in principle, has a rectangular or, more specifically a square shape only in the respective illustrations. A plurality of fluid passage openings 12a-12e are formed in the surface part 10 Each opening has a circular cross-sectional shape, or in other words, a circular opening cross-section. The passage openings are uniformly disposed in rows 14a-14c along the direction of the x-axis and in columns 15b-15e along the direction of the y-axis. The rows 14a-14c and columns 15b-15e of the fluid passage openings 12a-12e are alternately offset from one another in such a way that a fluid passage opening 12d of a row 14b is axially disposed, when viewed in the direction of the x-axis, between the adjacent fluid passage openings 12a, 12c, 12e of the two nearest rows 14a, 14c. Accordingly, the fluid passage opening 12d of the column 15d is axially disposed, when viewed in the direction of the y-axis, between the adjacent fluid passage openings 12a, 12c, 12e of the two closest columns 15c, 15e.

Figure 1B:
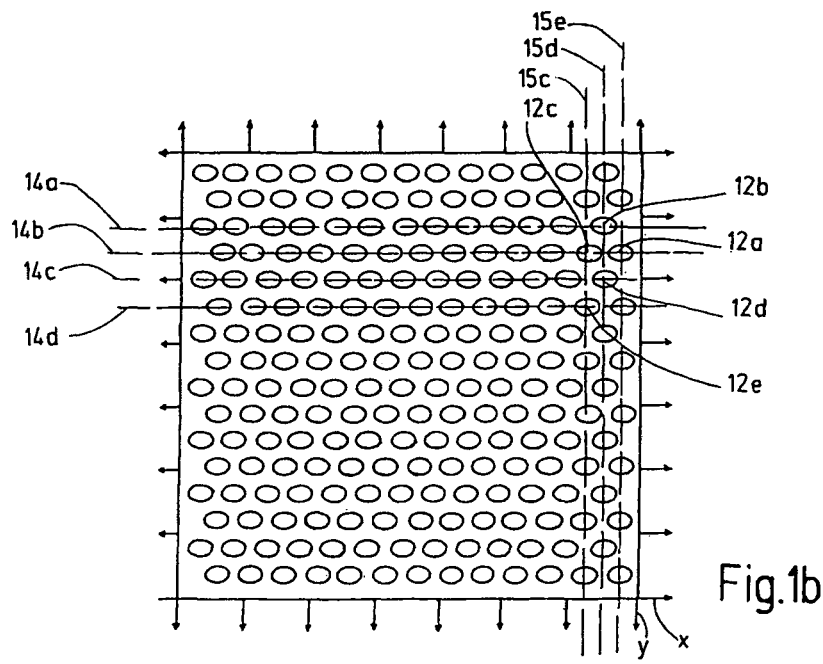
FIG. 1b a top view of a surface part according to an exemplary embodiment of the invention.
Figure 2B:
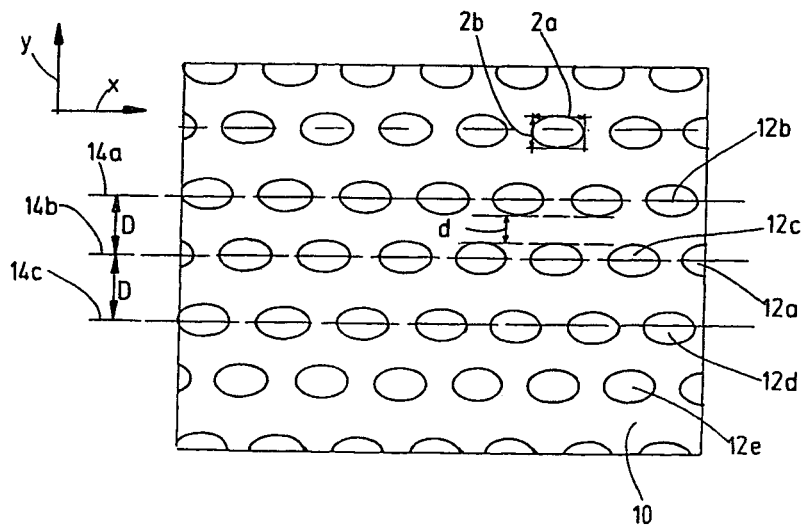

FIG. 1b and FIG. 2b shown an enlarged surface part 10 designed according to the invention, which differs from the conventional surface part shown in FIGS. 1a and 2a in that the fluid passage openings 12a-12e have elliptical opening cross-sections. As a result of the outer contour of the respective fluid passage opening 12a-12e, which deviates from a circular form, the surface part 10 according to the invention has an optimized perforation, which results in an improved tensile strength. While in known support structures, the force required for plastic deformation is approximately 0.3-1.5 N/µm, this value can be increased in a surface part according to the invention to up to 2.4 N/µm. The force needed for plastic deformation in the direction of the x-axis or y-axis is indicated in FIGS. 1a and 1b by arrows on the edge faces of the respective surface part 10.

In FIG. 2b, the geometric design of the fluid passage openings 12a-12e formed according to the invention is clearly visible. The respective ellipse has a first axis 2a in the direction of the x-axis, and a second axis 2b in the direction of the y-axis. In the normal form, which is to say for coincident coordinates and ellipse axis, the ellipse equation for the respective fluid passage opening 12a-12e is $x^2/a^2+y^2/b^2=1$. As a result of the elliptical shape of the respective opening cross-section, which is elongated in the direction of the x-axis, the distance d between fluid passage openings 12a-12c of immediately adjacent rows 14a, 14b is increased as compared to the distance d' for the columns 15b, 15c, known from the prior art shown in FIG. 2a, which is the same for rows and columns and accordingly. The distance between the fluid passage openings of immediately adjacent columns is reduced, which results in an improved tensile strength of the surface part 10, in particular in the direction of the y-axis. In particular, width to length ratios are sought, which preferably fall, as integer ratios, between 1:1 and 1:5, wherein the later value is also achievable, whereas the former value would directly affect a circle that is not attributable to the claimed elliptical shape.

In the case of the configuration or reconfiguration of the surface part 10 according to the invention, i.e. in the transition from FIGS. 1a and 2a to FIGS. 1b and 2b, the distance D between the center points of the fluid passage openings 12a-12e disposed in columns 15b-15e and rows 14a-14d remains unchanged, and the opening cross-sections of the fluid passage openings 12a-12e are not reduced in size, so that the fluid permeability of the surface part 10 is not impeded. In addition, however, the respective opening cross-section is advantageously enlarged in terms of surface area, so that in addition to an improved tensile strength, an increased fluid permeability is also achieved.

The fluid passage openings 12a-12e may be disposed such that they are offset by 90° or in other words, may be formed such that they are elongated in the direction of the y-axis. This results in an improved tensile strength, in particular in the direction of the x-axis. In order to obtain a particularly good mechanical stability of the surface part 10 and of a support structure formed thereby, fluid passage openings 12a-12e are formed in the surface part 10 having an elliptical shape oriented in part in the direction of the x-axis and oriented in part in the direction of the y-axis. If the reverse burst pressure is considered, conventional support structures achieve a differential pressure of approximately ca. 2.3 bar in ca. 170 seconds, of approximately 2.4 bar in 300 seconds, and 2.1 bar in 320 seconds. A differential pressure of more than 4 bar within a period of 330 seconds can be withstood as a result of the perforation according to the invention.

Figure 3:
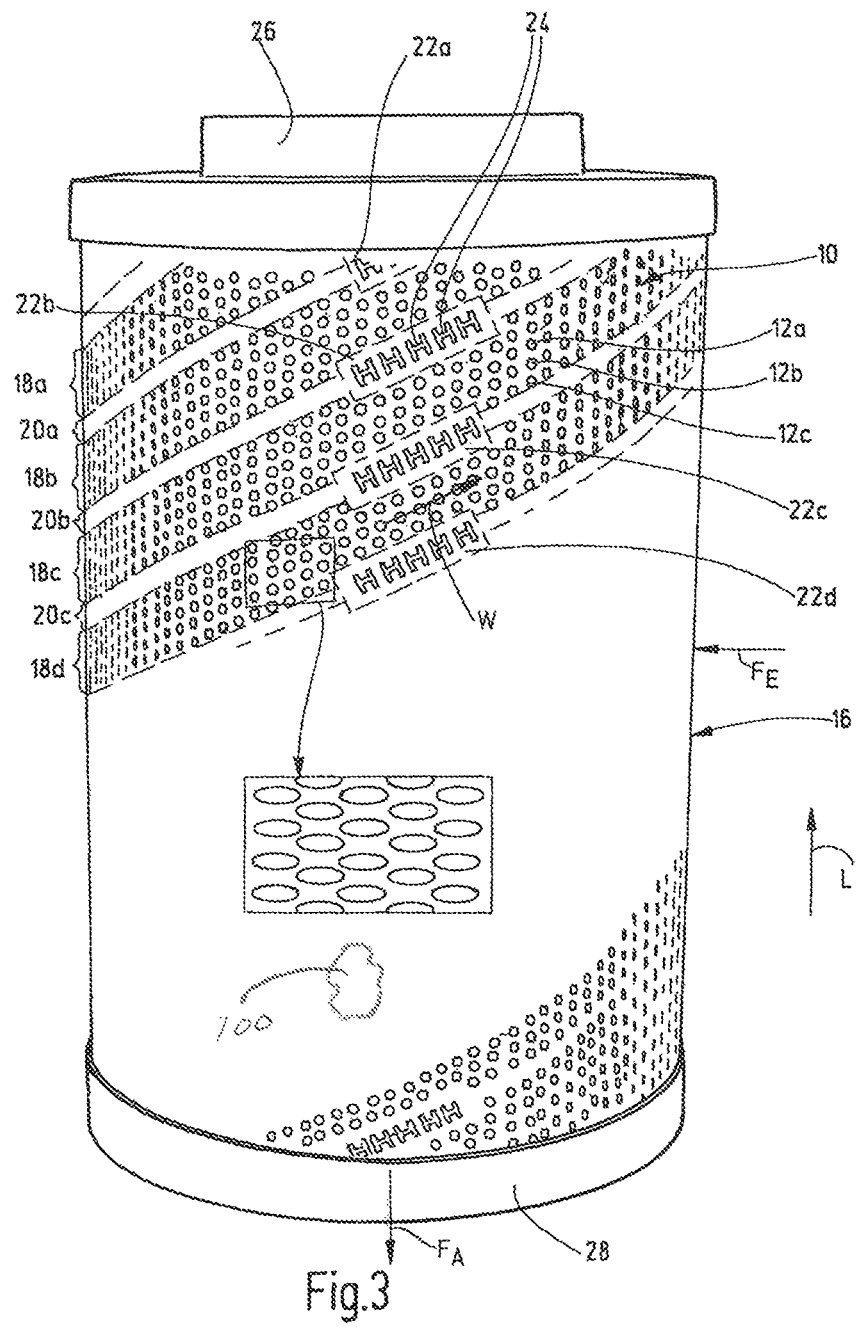
FIG. 3 is a perspective view of a filter element having a support structure according to an exemplary embodiment of the invention.

FIG. 3 shows a surface part 10, which has been positioned as a casing-shaped support structure 16. First surface regions 18a-18d are aligned in a winding direction W that extends transversely with relation to the longitudinal direction L of the casing-shaped support structure 16. Each first surface region has uniformly disposed, adjacent fluid passage openings 12a-12c, with each passage opening having an elliptical opening cross-section. Second surface regions 20a-20c, in which no fluid passages are formed, are formed between each of the web-shaped first surface regions 18a-18d. The second surface regions, in this respect, improve the mechanical stability of the support structure 16. In the case of a winding structure of the support structure 16, the junctions of adjacent surface parts or of a surface part coiled in the winding direction W, respectively, are formed in the second surface regions 20a-20c.

The second surface regions 20a-20c are each interrupted by a marking area 22a-22d. All marking areas 22a-22d in the present example are disposed in a longitudinal direction L, one above the other. In the marking areas 22a-22d, five additional, adjacent fluid passage openings 24 disposed in the winding direction W are each configured in the shape of a letter, in this case, the letter H. The corresponding marking also then acts as a fluid passage.

The fluid passage openings 12a-12c are disposed along the first surface regions 18a-18d extending in the winding direction W adjacent to one another in such a way that five fluid passage openings 12a-12c are each disposed adjacent to one another and aligned in a longitudinal direction L. The fluid passage openings 12a-12c are each formed so as to be oval or elliptical, extending in the horizontal direction, which is to say, transverse to the longitudinal direction L. In the manufacture of the surface part 10, the fluid passage openings 12a-12c are formed and aligned according to the installation situation shown here, or more precisely, the angle formed by the longitudinal direction L and the winding direction W of the respective web-shaped surface region 18a-18d.

The number, formation and arrangement of the fluid passage openings 12a-12c, 24 may be adjusted and optimized according to the requirements. The casing-shaped, in particular, tubular, cylindrically formed, support structure 16 is disposed between an upper end cap 26 and a lower end cap 28. With these end caps, the surface part forms a filter element that is otherwise not shown. During the operation of the filter, the flow typically passes through the filter element from the outside to the inside, from a filter inlet to a filter outlet, as indicated by the arrows FE and $F_A$. The filter medium 100 of the filter element abuts the support structure 16.

While various embodiments have been chosen to illustrate the invention, it will be understood by those skilled in the art that various changes and modifications can be made therein without departing from the scope of the invention as defined in the claims.

The invention claimed is:

1. A filter element, comprising:
a filter medium; and
a support structure having a longitudinal axis, abutting said filter medium and having a plurality of fluid passage openings therein, said passage openings having elliptical-shaped cross sections with an equation of $x^2/a^2+y^2/b^2=1$ and with longer or major axes of said elliptical-shaped cross sections extending transversely to said longitudinal axis of said support structure and shorter or minor axes extending parallel to said longitudinal axis, said support structure being shaped as an outer tubular casing having a surface part forming said casing and abutting said filter medium when positioned on said filter medium, said fluid passage openings being disposed in first surface regions of said surface part in a pattern of rows and columns.

2. A filter element according to claim 1 wherein said surface part has a rectangular shape and extends in directions of an x-axis extending along said longitudinal axis and a y-axis extending transversely to said longitudinal axis, said fluid passage openings in said surface part being uniformly disposed in said rows along said x-axis and in said columns along said y-axis and being alternately offset from one another such that said fluid openings in each of said rows are medially disposed in the direction of said x-axis between adjacent ones of said fluid passage openings in nearest two of said rows and such that said fluid passage openings in each of said columns are medially disposed in the direction of said y-axis between adjacent ones of said fluid passage openings in nearest two of said columns.

3. A filter element according to claim 2 wherein said fluid passage openings in adjacent rows partially overlap in the direction of the y-axis.

4. A filter element according to claim 1 wherein said surface part comprises a continuous, web-shaped strip wound in a winding direction extending obliquely relative to said longitudinal axis of said support structure.

5. A filter element according to claim 4 wherein the winding direction of said strip is in a shape of a coil, spiral or helix extending axially and circumferentially relative to said longitudinal axis of said support structure.

6. A filter element according to claim 5 wherein said first surface regions are oriented in the winding direction and extend obliquely relative to said longitudinal axis of said support structure, each of first surface regions having said fluid passage openings uniformly disposed therein.

7. A filter element according to claim 6 wherein said strip comprises second surface regions without passages formed therein, at least one of said second surface regions being between each adjacent pair of said first surface regions.

8. A filter element according to claim 7 wherein junctions of a welded joint or a continuous folded seam are provided in adjacent ones of said second surface regions, leaving said fluid passage openings in said first surface regions free.

9. A filter element according to claim 7 wherein said first surface regions with said fluid passage openings are delimited peripherally by adjacent, opposite strip edges of said second surface regions.

10. A filter element according to claim 2 wherein at least one marking area having a recognizable marking is formed on said surface part.

11. A filter element according to claim 10 wherein said marking is formed by a marking fluid passage opening in said surface part.

12. A filter element according to claim 1 wherein said casing has a cylindrical shape.

* * * * *